R. T. PAYNE.

Improvement in Hedge-Trimmers.

No. 129,493.  Patented July 16, 1872.

Scale

Witnesses.
Henry Marshall
Wilfred Carter

Rowland T. Payne
by Edmund Thurlow
his Atty in Fact

AM. PHOTO-LITHOGRAPHIC CO. N.Y. (OSBORNE'S PROCESS.)

129,493

UNITED STATES PATENT OFFICE.

ROWLAND T. PAYNE, OF EUREKA, ILLINOIS, ASSIGNOR OF ONE-HALF OF HIS RIGHT TO CHARLES W. REYNOLDS, OF SAME PLACE.

IMPROVEMENT IN HEDGE-TRIMMERS.

Specification forming part of Letters Patent No. 129,493, dated July 16, 1872.

*To all whom it may concern:*

Be it known that I, ROWLAND T. PAYNE, of town of Eureka, in county of Woodford, and in the State of Illinois, have invented an Implement for Trimming Hedges; and do hereby declare that the following is a full, clear, and exact description thereof, reference being had to the annexed drawing making a part of this specification, in which like letters of reference refer to like parts, and in which—

Figure 1:
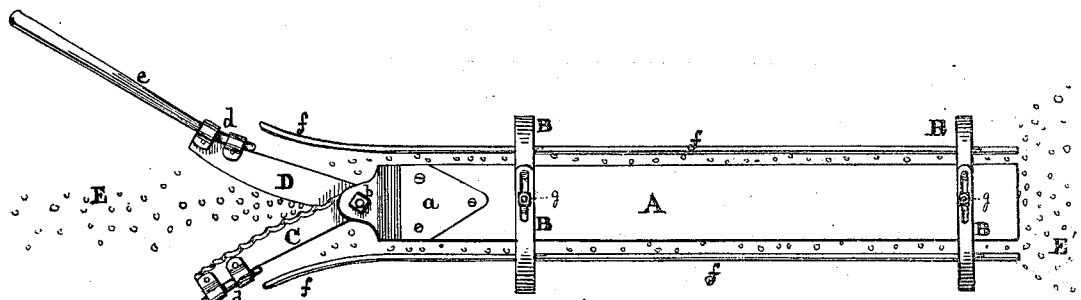
Figure 2:
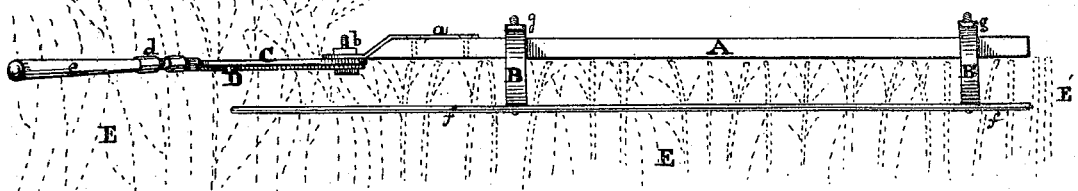
Figure 3:
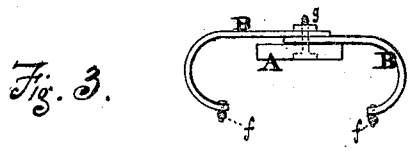

Figure 1 represents a plan; Fig. 2, an elevation, longitudinal; Fig. 3, end elevation.

This invention consists of a center plank of wood, about ten or twelve inches in width and about eight feet in length, to which are attached two parallel rods, made adjustable to either side of the stems of the hedge to be trimmed, beneath and at either side of the plank. To one end of the latter are pivoted two knives, which work by means of hand-levers, conjointly severing the hedge as fast as the plank with its rods or guides is advanced.

A represents a plank or guide-board, about eight feet in length by about ten inches in width and one inch in thickness, to one end of which the knives C D are pivoted in the pivot-plate $a$, or an equivalent for attaching the knives. This plank lies horizontally upon the tops of the cut hedge, from whence the upper part has been cut. B B represent adjustable braces having slots in the ends, which are fastened adjustably to the plank A by means of the bolt and nut $g$. Two of these braces are placed at or near each end of said plank in pairs, one on each side of the same, each curving downward over the edge of the plank, and at several inches below the latter are attached firmly to the rod $ff$ on that side of the plank. There are two of these rods, one on each side of said plank, parallel to the latter, and are capable of being adjusted to the denseness or thinness of the hedge by means of their braces B B B B. The forward ends of these rods next to the knives C D open or diverge somewhat, and extend nearly to the forward end of the knives. C D are two knives, working horizontally, about two feet and a half in length, having an edge curving outward like a cheese-knife, and with a common pivot at $b$ in the head of the plate $a$, or in front of the board or plank A. One of the knives may be serrated, or rather its curved edge is provided with curved recesses or cutting-places, so as to confer upon the knife extra power to retain and cut the thicker branches or stems of the hedge. At the free ends of the knives are attached sockets $d\ d$ to receive handles or levers $e\ e$, which project from the same in nearly the same line as that of the knives. The serrated knife is used for cutting stout hedges only, as the other, D, and a similar one acting together are sufficient to trim the lighter hedges.

The operation of this device is as follows: The guide-plank A is supported horizontally at the commencement of the hedge until a sufficient quantity of the "tops" has been trimmed off, by means of the knives C D or other means, at the required height for the trimmed hedge, to make room upon the cut tops of the standing stems thus severed for the guide-plank to rest thereon horizontally. The guide-rods $ff$ are now adjusted as closely as possible against the outer flanks of the hedge on each side, so as to compress the stems sufficiently to afford a steady support by means of said rods $ffff$ to support the plank A, that the attached knives may be operated so as to cut on a horizontal line. Said rods $ffff$ are so adjusted for this purpose by means of extending or shortening in their attached braces B B by the proper adjustment of the bolt passing through the slots in said braces, and securing them by the nuts $g\ g$. The knives C D, or two plain knives like D, are now pressed together from each side of the hedge, cutting off the "top" at the required height, and in a true horizontal line.

What I claim as my invention is—

The guide or board A, provided with several adjustable braces B B B B, or equivalents, their attached parallel rods $f\ f$, the pivoted knives C D, and their pivot-plate $a$, or its equivalent.

In testimony that I claim the foregoing hedge-trimmer I have hereunto set my hand this 18th day of May, A. D. 1872.

ROWLAND T. PAYNE.

Witnesses:
JOHANNES MANTON,
LEVI A. LAPHAM.